US005503894A

United States Patent [19]

Brown

[11] Patent Number: 5,503,894

[45] Date of Patent: Apr. 2, 1996

[54] PADDED CONSTRUCTION FOR USE IN STRAPS AND THE LIKE

[75] Inventor: Roy L. Brown, Nevada, Mo.

[73] Assignee: Ortho-Flex Saddle Company Inc., Nevada, Mo.

[21] Appl. No.: 923,490

[22] Filed: Aug. 3, 1992

[51] Int. Cl.$^6$ .......... B32B 3/04

[52] U.S. Cl. .......... 428/128; 428/129; 54/25; 54/34; 54/58; 119/792

[58] Field of Search .......... 428/36.2, 36.5, 428/74, 76, 126, 127, 128, 129; 119/101, 792; 54/25, 34, 58

[56] References Cited

U.S. PATENT DOCUMENTS

| | | | |
|---|---|---|---|
| 4,133,604 | 1/1979 | Fuller | 351/123 |
| 4,657,364 | 4/1987 | Murrell | 351/156 |
| 4,827,796 | 5/1989 | Horian | 24/584 |
| 4,881,276 | 11/1989 | Swan | 2/161 A |
| 5,134,836 | 8/1992 | Harty | 54/23 |
| 5,157,425 | 10/1992 | Liu | 351/156 |

OTHER PUBLICATIONS

Rubatex Brochure; S–90 RE: Closed Cell Rubber and Plastic Sheets 1990.

Ortho–Flex Catalog, Brown's Performance Saddles, 1989.

*Primary Examiner*—Christopher W. Raimund

*Attorney, Agent, or Firm*—Hovey, Williams, Timmons & Collins

[57] ABSTRACT

A padded construction useful for straps or irregularly-shaped articles is provided which includes a pair of opposed outer panels and a core sandwiched between the outer panels with side margins extending between the latter and having the core between the side margins. One of the outer panels and the side margins are formed of a closed cell neoprene synthetic resin foam material, whereas the core includes a length of synthetic resin (e.g., nylon or polyester) webbing. In one embodiment, the outer panels and side margins are integrated to present a tubular section of the neoprene foam material, and the core is disposed within the tubular section; an exterior decorative leather piece may be attached by sewing through the tubular subassembly. In another embodiment, the core includes an internal leather strap to which the webbing is attached, and neoprene is first applied to the core subassembly and is wrapped around the side margins thereof in an overlapping fashion. At this point, exterior decorative leather may be applied by stitching to complete the construction.

6 Claims, 1 Drawing Sheet

PADDED CONSTRUCTION FOR USE IN STRAPS AND THE LIKE

BACKGROUND OF THE INVENTION

1. Field of the Invention

The present invention is broadly concerned with improved padded constructions which can be fabricated in a variety of shapes and used in items such as collars, harnesses, belts, straps, wristbands, restraining devices, headstalls, bridles, holsters, cinches and other tack constructions. More particularly, it is concerned with such padded devices which includes a pair of outer panels, at least one of which is formed of a closed cell neoprene foam material which is designed for contacting a surface to be restrained or protected; this panel resists take-up of moisture and has an extremely low friction coefficient which virtually eliminates chaffing and abrasion to skin or hide surfaces. A core is provided between the panels in the form of a non-stretch synthetic resin webbing, which gives strength and dimensional stability to the construction.

2. Description of the Prior Art

Tack items such as horse collars, harnesses, straps have long been fabricated from leather and leather-like materials. While such prior constructions have adequate wear characteristics, they can chafe or abrade the horse's hide due to movement and chafing thereof. In addition, such devices have a tendency to absorb perspiration, which not only exacerbates the abrasion problem, but also increases the weight thereof. Finally, items composed entirely of leather without padding can be extremely uncomfortable over extended wear periods.

These same difficulties can also apply in items worn by humans and domestic pets such as wrist bands, belts and collars, particularly when these are subjected to heavy use and wear.

There is therefore a need in the art for an improved padded construction which can be used in a variety of contexts for both animal (e.g., equine, canine and feline) and human uses which virtually eliminates problems associated with chafing and abrasion, while also resisting uptake of perspiration moisture. In addition, the construction should be one which can be readily adapted for a variety of ornamental additions, in order to create aesthetically pleasing devices.

SUMMARY OF THE INVENTION

The present invention overcomes the problems outlined above, and provides a greatly improved padded construction having a number of uses such as for strap goods and devices of unusual shapes. Broadly speaking, the padded construction of the invention is in the form of a body presenting a pair of opposed outer panels with a core sandwiched between the outer panels, and a pair of side margins extending between the outer panels with the core located between the side margins. One of the outer panels and the side margins are formed of closed cell neoprene synthetic resin foam material, whereas the core includes a length of stretch-resistant synthetic resin webbing.

In one form of the invention, the core is made up of an inner sheet of leather, with the webbing being secured thereto by stitching and/or adhesive means. The webbing is advantageously selected from the group consisting of nylon and polyester webbings. Moreover, depending upon the width of the item, a plurality of side-by-side lengths of webbing can be employed in the core.

In another form of the invention, the outer panels and side margins are integrated and present a tubular section of the foam material, with the core being disposed within the tubular section. In this design, both of the outer panels are formed of the neoprene synthetic resin foam material.

It is also possible by stitching or other means to affix decorative material to one of the outer panels. Such decorative material may be in the form of a layer of leather or similar material.

DETAILED DESCRIPTION OF THE PREFERRED EMBODIMENTS

Figures 1, 2, 3, 4:
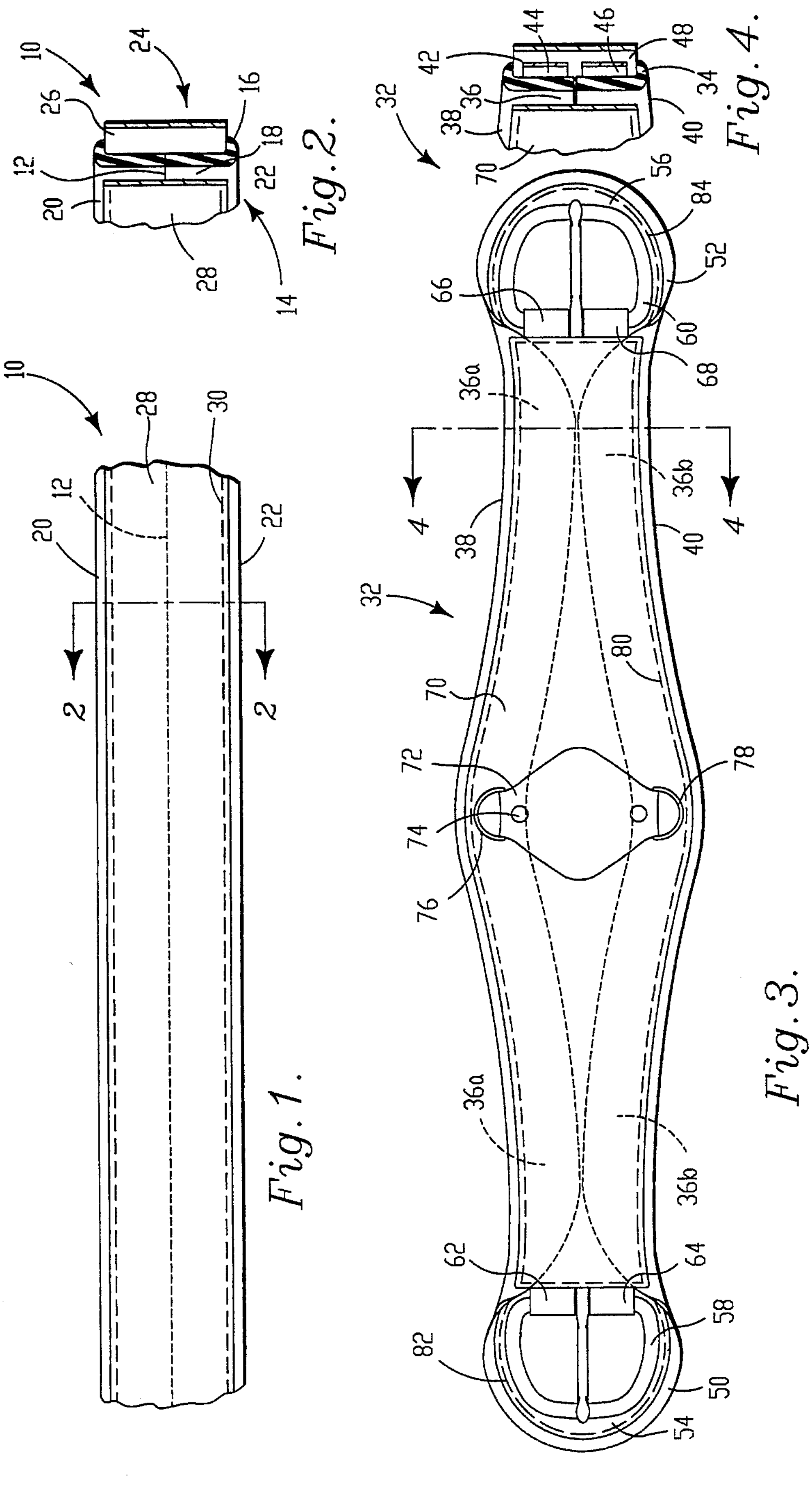
FIG. 1 is a fragmentary plan view of a strap construction in accordance with the invention.
FIG. 2 is a sectional view taken along line 2—2 of FIG. 1, with the strap components being relatively shifted to better illustrate the internal construction of the strap.
FIG. 3 is a plan view of another construction in accordance with the invention making use of irregularly dimensioned panels.
FIG. 4 is a sectional view taken along line 4—4 of FIG. 3, with the strap components being relatively shifted to depict the internal construction of the device.

Turning now to the drawings, and particularly FIGS. 1–2, a strap construction 10 in accordance with the invention is illustrated. In this design, closed cell neoprene material having a thickness of from about ⅛ inch to ¼ inch is sewn together along a seam line 12 so as to present a tubular section 14 of the neoprene material. The section 14 thus presents a pair of opposed, outer primary panels 16 and 18, as well as side margins 20, 22. The overall construction 10 also includes a core 24, in this instance a single length of nylon or polyester webbing 26. The strap is completed by provision of an outermost layer of decorative leather 28, which is affixed to the padded construction by means of stitching 30 extended through both of the panels 16, 18, as well as webbing 26.

The construction 10 is advantageously formed by first interconnecting the neoprene material to form the described tube, whereupon the webbing 26 is inserted within the confines of the tube. As this point, the exterior decorative leather 28 is positioned in face to face relationship with outer panel 18 and stitching 30 is completed to integrate the entire construction 10.

It will be noted in this respect that the construction 10 thus presents a skin or hide-contacting panel 16 remote from decorative leather 28 which is formed of the closed cell neoprene foam. Similarly, the side margins 20, 22 are likewise formed of this soft, resilient material, to present rounded edges. In this fashion, the relatively rough leather 28 never comes into contact with an underlying contact surface, being it the skin of a person, the hide of an animal, or the surface of an object on which the strap is used. Moreover, the neoprene panel 16 and rounded side margins 20, 22 are relatively impervious to absorption of perspiration moisture, and accordingly the decorative leather is not subjected to such moisture.

Attention is next directed to FIGS. 3 and 4, which depict a rear girth strap 32 used in saddling of horses. The strap 32 likewise presents an interior horse-contacting panel 34 formed of neoprene as well as an opposed panel 36 primarily made up of overlapped elongated neoprene sections 36*a*, 36*b*. Rounded side margins 38, 40 are also provided, and these interconnect neoprene panel 34 and the overlap sections 36*a*, 36*b*. A core 42 is disposed between the panels 34, 36, and is made up of a pair of juxtaposed lengths of webbing 44, 46, as well as a strip of internal leather 48. The outermost ends of the girth strap 32 include neoprene extensions 50, 52 respectively supporting rounded extensions 54, 56 of internal leather strip 48, as well as buckles 58, 60 secured to the extreme loop ends 62, 64 and 66, 68 of the core webbing lengths 44, 46. The strap 32 is completed by provision of an exterior layer of decorative leather 70, the latter having a central fixture 72 connected thereto by rivets 74 and presenting a pair of endmost D-loops 76, 78.

In fabrication procedures, the internal leather 48 is first wet molded to the desired contour, whereupon the webbing lengths 44, 46 are applied to the upper surface of the leather to increase its strength and prevent undue stretching. The webbing 44, 46 may be applied by stitching and/or gluing as desired. At this same time, the buckles 58, 60 are attached by forming the endmost loops 62–68 around the bases of the buckles and securing the extreme ends of the webbing to the leather strap 48. Alternately, the internal leather 48 may be wet molded after webbing application and buckle attachment.

In the next step, a neoprene layer having the configuration depicted in FIG. 3, being wider along the length thereof than the corresponding width of leather strap 48 and presenting the elongated neoprene sections 36*a*, 36*b* and having the endmost arcuate extensions 50, 52, is cut and placed with the closed skin side down. The leather and webbing subassembly is then glued to the upper, rough, open cell surface of the neoprene, and the extra width of the neoprene represented by the sections 36*a*, 36*b* is rolled over the upper surface of leather strap 48, to form the rounded, padded side margins 38, 40. The sections 36*a*, 36*b* and may be glued to the upper surface of the leather strap 48 if desired.

In the next step, the exterior leather 70 is applied over the neoprene sections 36*a*, 36*b* and the upper surface of the interior leather strap. The exterior leather 70 is then sewn in place along stitching line 80, thereby effectively holding down the neoprene directly beneath the exterior leather 70 and leaving the desirable outermost rounded neoprene side margins 38, 40. In addition, the rounded ends of the leather strap 48 are secured to the similarly configured extensions 50, 52 by stitching 82 and 84. It has been found that it is important to construct complex shapes such as the girth strap 32 by first attaching the neoprene to an internal leather and webbing core, followed by formation of the neoprene side margins and final attachment of the neoprene and any external decorative leather desired.

Neoprene is the common name for polychloroprene, $(CH_3ClC{:}CHCH_3)_n$, CAS #126-99-8. It is a synthetic elastomer available as a flexible foam. Neoprene is known to be resistant to oils, oxygen, ozone, corona discharge and electric current. Neoprene foam has a variety of uses including adhesive tape to replace metal fasteners for automotive accessories, in seat cushions, as carpet backing, and as a sealant.

The most preferred neoprene foam material is a commercially available from Rubatex Corp. of Bedford, Va. as Rubatex® R-400-N closed cell expanded neoprene foam. This product has the following physical properties: compression deflection, 2–5 psi; Shore OO Durometer, 25–45 (approximate average); density, 8–15 lb/ft$^3$; maximum water absorption by weight, 5%; temperature ranges, low (flexure without cracking) 150° F. high continuous, 130° high intermittent, 200° F.; heat aging (7 days at 158° F.), 10% maximum lineal shrinkage; tensile strength, 75 psi minimum; elongation, 300% minimum; fungus resistance (MIL-STD-810C, Method 508.1), satisfactory; flammability (FMVSS #302), zero burn rate in inches per minute, with a minimum thickness of ⅛ inch; and resilience (Base Shore), 1% rebound average, ½ inch thickness at 72° F., 40–50%.

The nylon or polyester webbing used in the invention is likewise commercially available, and is characterized by a high strength-to-weight ratio and resistance to stretching. Nylon is the generic name for a family of polyamide polymers $(C_6H_{12}NO)_n$, CAS #63428-83-1. The most preferred nylon material is likewise a commercially available Rubatex® 900 series nylon having: a circular knit; a nominal weight of 2.5 ounces per square yard; a stretch of 135–175 wales length, and 225–400 courses width; and 35 yarns per inch-wales and 65 yarns per inch-courses. Other commercially available nylons which may be used are sold by A. Lowy Enterprises of Long Beach, Calif. under the designations WB9U-BLK (commercial equivalent to Mil-W-4088, Type 9, 9000 lb.), WB25/100-BLK (commercial equivalent to Mil-W-4088, Type 25, 4000 lb.), WP17U-BLK (commercial equivalent to Mil-W-4088, Type 17, 2500 lb.) and WBCSBT/112-BLK (nylon child's seat belt webbing 1½ inch, 1500 lb).

The polyester webbing is formed from polyester fiber in which the fiber-forming substance is in a long chain synthetic polymer comprised of at least 85% by weight of an ester of a dihydric alcohol and terephthalic acid. The preferred polyester material useful in the invention is sold by A. Lowy Enterprises of Long Beach, Calif. under the designation WBSBT/2-BLK/5BAR, and is commonly used as a 1$^{15}/_{16}$ inch, 6000 lb. polyester seat belt webbing.

I claim:

1. A padded strap for use with tack to be fitted on an animal, the strap comprising:

an elongated core assembly including an internal core strap formed of leather and including opposed upper and lower surfaces separated from one another by elongated lateral edges, and a strip of stretch-resistant webbing substantially coextensive with the core strap; and an outer panel formed of a synthetic resin elastomer and having an inner surface adjacent the lower surface of the core strap, an outer surface that is exposed for contact with the hide of the animal on which the tack is to be fitted, and a pair of elongated panel edges separating the inner and outer panel surfaces, the outer panel being formed of a width greater than the width of the core strap and including side margins that extend around the edges of the core strap and overlap the upper surface.

2. The padded strap as recited in claim 1, wherein the strip of stretch-resistant webbing is formed of a material selected from the group consisting of nylon and polyester webbing.

3. The padded strap as recited in claim 1, wherein the outer panel is formed of a closed cell neoprene synthetic resin foam material.

4. A padded strap for use with tack to be fitted on an animal, the strap comprising:

an elongated core assembly including an internal core strap formed of leather and including opposed upper and lower surfaces separated from one another by elongated lateral edges, and a strip of stretch-resistant webbing substantially coextensive with the internal core strap;

an outer panel formed of a synthetic resin elastomer and having an inner surface adjacent the lower surface of the core strap, an outer surface that is exposed for contact with the hide of the animal on which the tack is to be fitted, and a pair of elongated panel edges separating the inner and outer panel surfaces, the outer panel being formed of a width greater than the width of the core strap and including side margins that extend around the edges of the core strap and overlap the upper surface; and an exterior strap formed of leather, the exterior strap overlapping the edges of the outer panel and being secured to the core assembly, the side margins of the outer panel extending laterally beyond the exterior strap so that the exterior strap is isolated from contact with the animal on which the tack is fitted.

5. The padded strap as recited in claim 4, wherein the core strap is formed of a material selected from the group consisting of nylon and polyester webbing.

6. The padded strap as recited in claim 4, wherein the outer panel is formed of a closed cell neoprene synthetic resin foam material.

* * * * *